US012249469B2

(12) United States Patent
Fischer-Carne et al.

(10) Patent No.: US 12,249,469 B2
(45) Date of Patent: Mar. 11, 2025

(54) CIRCUIT BREAKER HAVING VACUUM INTERRUPTERS AND SINGLE-PHASE CONTROL WITH MAGNETIC ACTUATORS AND ASSOCIATED METHOD

(71) Applicant: JST POWER EQUIPMENT, INC., Lake Mary, FL (US)

(72) Inventors: Patrick R. Fischer-Carne, New Smyrna Beach, FL (US); Robert L. Hanna, Enterprise, FL (US)

(73) Assignee: JST POWER EQUIPMENT, INC., Lake Mary, FL (US)

(*) Notice: Subject to any disclaimer, the term of this patent is extended or adjusted under 35 U.S.C. 154(b) by 244 days.

(21) Appl. No.: 17/652,112

(22) Filed: Feb. 23, 2022

(65) Prior Publication Data

US 2023/0268151 A1 Aug. 24, 2023

(51) Int. Cl.

| | |
|---|---|
| ***H01H 33/666*** | (2006.01) |
| ***H01H 47/22*** | (2006.01) |
| ***H01H 49/00*** | (2006.01) |
| ***H01H 50/18*** | (2006.01) |
| ***H01H 50/36*** | (2006.01) |

(52) U.S. Cl.
CPC .......... *H01H 33/666* (2013.01); *H01H 47/22* (2013.01); *H01H 49/00* (2013.01); *H01H 50/18* (2013.01); *H01H 50/36* (2013.01)

(58) Field of Classification Search
None
See application file for complete search history.

(56) References Cited

U.S. PATENT DOCUMENTS

| | | | | |
|---|---|---|---|---|
| 5,912,604 A | | 6/1999 | Harvey et al. | |
| 6,198,062 B1 | * | 3/2001 | Mather ................ | H01H 33/022 218/120 |
| 8,692,636 B2 | * | 4/2014 | Reuber .............. | H01H 33/6662 335/220 |
| 11,508,539 B2 | * | 11/2022 | Montenegro ........ | H01H 33/027 |
| 2023/0335356 A1 | * | 10/2023 | Hanna ...................... | H02B 1/38 |

FOREIGN PATENT DOCUMENTS

| | | |
|---|---|---|
| GB | 2305557 A | 4/1997 |
| WO | 2013/169716 A1 | 11/2013 |

OTHER PUBLICATIONS

U.S. Appl. No. 17/422,825, filed Jul. 14, 2021 Inventors: Robert L. Hanna et al.

* cited by examiner

*Primary Examiner* — Bernard Rojas
(74) *Attorney, Agent, or Firm* — ALLEN, DYER, DOPPELT + GILCHIRST, PA

(57) ABSTRACT

A circuit breaker may include a first magnetic actuator connected to a first single-phase vacuum interrupter, a second magnetic actuator connected to a second single-phase vacuum interrupter, and a third magnetic actuator connected to the third single-phase vacuum interrupter. Each magnetic actuator is configured to receive an interrupt signal, and in response, actuate a respective vacuum interrupter connected thereto into an open circuit condition. Each magnetic actuator includes a fixed core, a plurality of permanent magnets surrounding the fixed core, and a movable core received within the fixed core. A controller generates an interrupt signal to a respective magnetic actuator and interrupts one or more of the first, second and third single-phase vacuum interrupters.

19 Claims, 6 Drawing Sheets

CIRCUIT BREAKER HAVING VACUUM INTERRUPTERS AND SINGLE-PHASE CONTROL WITH MAGNETIC ACTUATORS AND ASSOCIATED METHOD

FIELD OF THE INVENTION

The present invention relates to the field of electrical systems, and more particularly, this invention relates to circuit breakers having magnetic actuators.

BACKGROUND OF THE INVENTION

Metal-clad or metal-enclosed medium voltage switchgear systems operate as three-phase systems that connect to the three-phase power distribution grid and provide various control functions and provide protection against short circuit events and similar overcurrent or other fault conditions. They often include circuit breakers, which open and close individual circuits, and for indoor circuits may be mounted on a truck that is movable within a compartment of a switchgear frame, but for outdoor breakers may not be mounted on a truck. A magnetic actuator may be carried on the breaker and has the biasing force to operate the vacuum interrupters. A permanent magnetic actuator has one or more permanent magnets and electric energy is applied to a coil to move a core or other mechanism into a stroke position which may open or close the contacts in a vacuum interrupter.

Permanent magnetic actuators can be formed as a bistable or mono-stable magnetic actuator depending on how their operating mechanism works and how any core or other mechanism is held at a preset position. A bistable type permanent magnetic actuator permits the core to be held at each of both ends of a stroke of the core due to the permanent magnets. A mono-stable type permanent magnetic actuator, on the other hand, is configured such that the core is held at only one of both ends of a stroke. Because a bistable type permanent magnetic actuator holds any core in a preset position by the magnetic energy imparted from the permanent magnets upon opening or closing the vacuum interrupter, the bistable actuator is considered by some skilled in the art to be better adapted for use with some circuit breakers. However, these magnetic actuators usually operate one latch connector or other common jack shaft that interconnect and switch open and closed three vacuum interrupters used in a three-phase electrical system. Single-phase operation is unworkable.

SUMMARY OF THE INVENTION

This summary is provided to introduce a selection of concepts that are further described below in the Detailed Description. This summary is not intended to identify key or essential features of the claimed subject matter, nor is it intended to be used as an aid in limiting the scope of the claimed subject matter.

A circuit breaker may include first, second and third single-phase vacuum interrupters. A first magnetic actuator may be connected to the first single-phase vacuum interrupter, a second magnetic actuator may be connected to the second single-phase vacuum interrupter, and a third magnetic actuator may be connected to the third single-phase vacuum interrupter. Each magnetic actuator may be configured to receive an interrupt signal and in response, actuate the respective vacuum interrupter connected thereto into an open circuit condition. Each magnetic actuator may comprise a fixed core, a plurality of permanent magnets surrounding the fixed core, a movable core received within the fixed core, and a controller connected to each of the first, second and third magnetic actuators, and configured to generate the interrupt signal to a respective magnetic actuator and interrupt one or more of the first, second and third single-phase vacuum interrupters.

The plurality of permanent magnets may be arranged in a square configuration around the fixed core. Each permanent magnet may comprise a bar magnet extending the length of a side forming the square configuration. A side plate may cover each permanent magnet forming a box configuration. Each movable core may comprise an output shaft, a piston carried by the output shaft and movable within the fixed core. First, second and third connectors may interconnect the output shafts of respective first, second and third magnetic actuators to respective first, second and third single-phase vacuum interrupters.

First, second and third single-phase inputs may be connected to respective first, second and third single-phase vacuum interrupters. First, second and third single-phase outputs are included and a relay is connected between the first, second and third single-phase vacuum interrupters and first, second and third single-phase outputs. The controller may be configured to generate the interrupt signal to at least one of the first, second and third magnetic actuators in response to a detected single-phase overcurrent or fault on a respective single-phase circuit.

A sensing circuit may be connected to the relay and first, second and third single-phase outputs and configured to detect a single-phase overcurrent on a single-phase circuit. The sensing circuit may comprise at least one current or potential transformer.

A method aspect is disclosed of building a three-phase circuit breaker having single-phase control and first, second and third single-phase vacuum interrupters. The method may comprise connecting a first magnetic actuator to the first single-phase vacuum interrupter, connecting a second magnetic actuator to the second single-phase vacuum interrupter, and connecting a third magnetic actuator to the third single-phase vacuum interrupter. The method includes receiving an interrupt signal within one of the magnetic actuators, and in response, actuating the respective vacuum interrupter connected thereto into an open circuit condition. Each magnetic actuator may comprise a fixed core, a plurality of permanent magnets surrounding the fixed core, and a movable core received within the fixed core. The method includes generating from a controller connected to each of the first, second and third magnetic actuators, the interrupt signal to a respective magnetic actuator, and interrupting a single-phase circuit and operating opening and closing operations.

BRIEF DESCRIPTION OF THE DRAWINGS

Other objects, features and advantages of the present invention will become apparent from the Detailed Description of the invention which follows, when considered in light of the accompanying drawings in which.

DETAILED DESCRIPTION

Different embodiments will now be described more fully hereinafter with reference to the accompanying drawings, in which preferred embodiments are shown. Many different forms can be set forth and described embodiments should not be construed as limited to the embodiments set forth herein. Rather, these embodiments are provided so that this disclosure will be thorough and complete, and will fully convey the scope to those skilled in the art.

Figure 1:
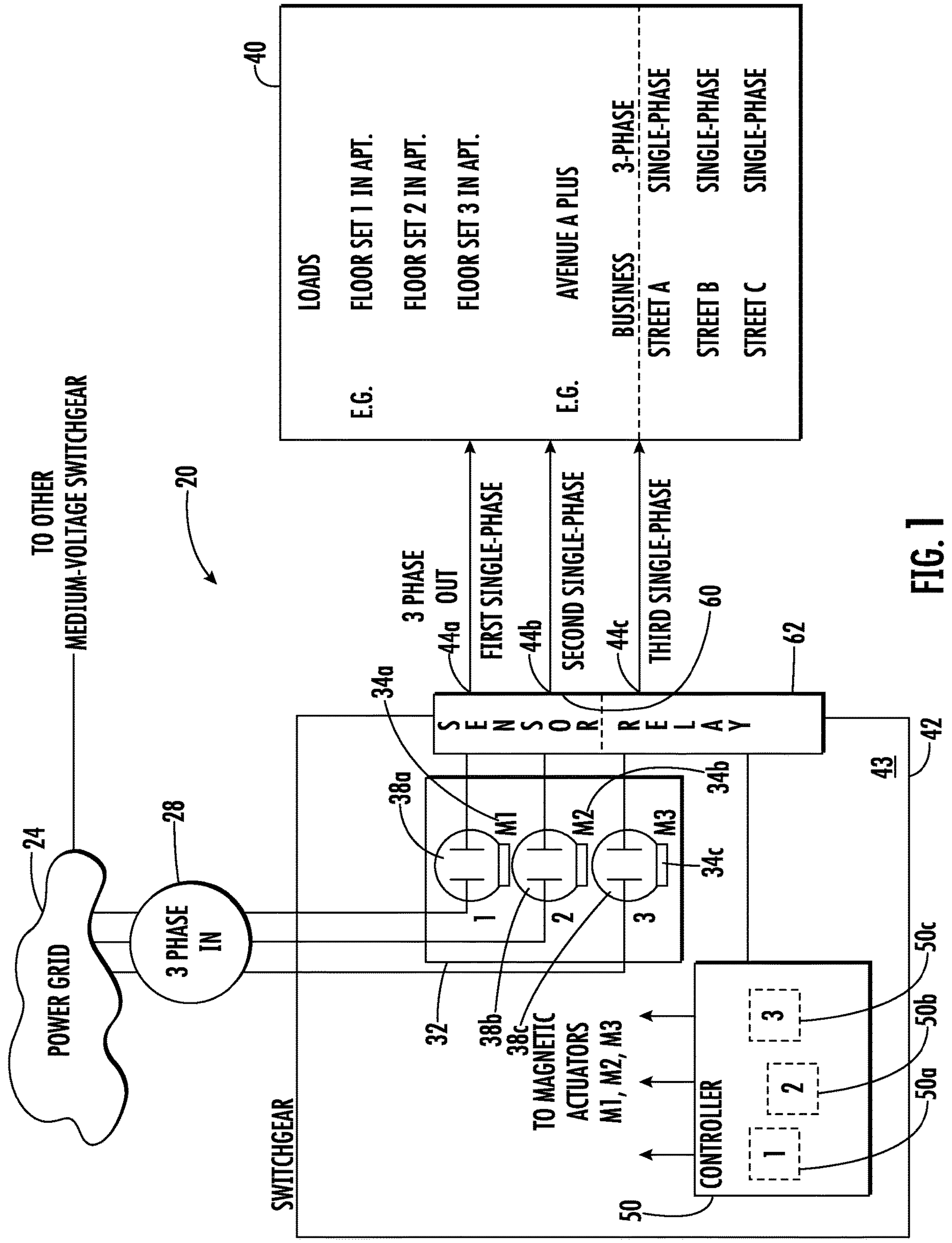
FIG. 1 is a block diagram of a three-phase power distribution grid and a medium-voltage switchgear having the circuit breaker with single-phase breaker control using magnetic actuators in accordance with a non-limiting example.

Referring now to FIG. 1, there is illustrated a schematic diagram of a medium-voltage switchgear 20 incorporated within a three-phase power distribution grid 24 that includes a three-phase input 28 having first, second and third single-phase input circuits into the medium-voltage switchgear. The switchgear 20 may be formed for an indoor or outdoor circuit and includes single phase breaker control that allows the switchgear 20 to provide single-phase control at the three-phase switchgear circuit breaker 32 such that a remaining single-phase line may power a neighborhood or a part of a residential tower when another of the single-phase lines may go down. In this example, the magnetic actuators shown schematically by M1, M2 and M3 and given the designation 34*a*, 34*b*, 34*c* actuate opening or closing of contacts within the first, second and third vacuum interrupters indicated at 38*a*, 38*b*, 38*c*.

Other neighborhoods or street sections are schematically illustrated by the block indicated as loads 40. For example, one floor section of the illustrated skyscraper, such as the upper floors, may have their power cut off when one single-phase is dropped, but the middle and lower floors may be supplied by the other two single-phases, and thus, power remains on those two floor sections. For example, the top upper floor apartments in a residential tower may have a short circuit in that single-phase segment, and that single-phase may be tripped at the single-phase pole, e.g., a vacuum interrupter for that phase, but the lower floor sections of the residential tower may have power provided from the other two single phase circuits and still maintain power to those lower floor apartments.

The switchgear 20 may include components common to many switchgear systems, such as a switchgear frame shown by the solid line at 42 having an interior compartment shown at 43 and the three-phase input connected to the respective first, second and third single-phase circuits of the three-phase power distribution grid 24. The switchgear 20 has first, second and third single-phase outputs 44*a*, 44*b*, 44*c*. Primary and secondary circuits may be included, and for an indoor switchgear, a circuit breaker truck 74 (FIG. 2) may carry the vacuum interrupters 38*a*, 38*b*, 38*c*, and associated magnetic actuators 34*a*, 34*b*, 34*c* carried thereon and supported for linear movement on side rails (not shown) provided on the switchgear frame 42. An outdoor switchgear may not include a truck.

Figure 2:
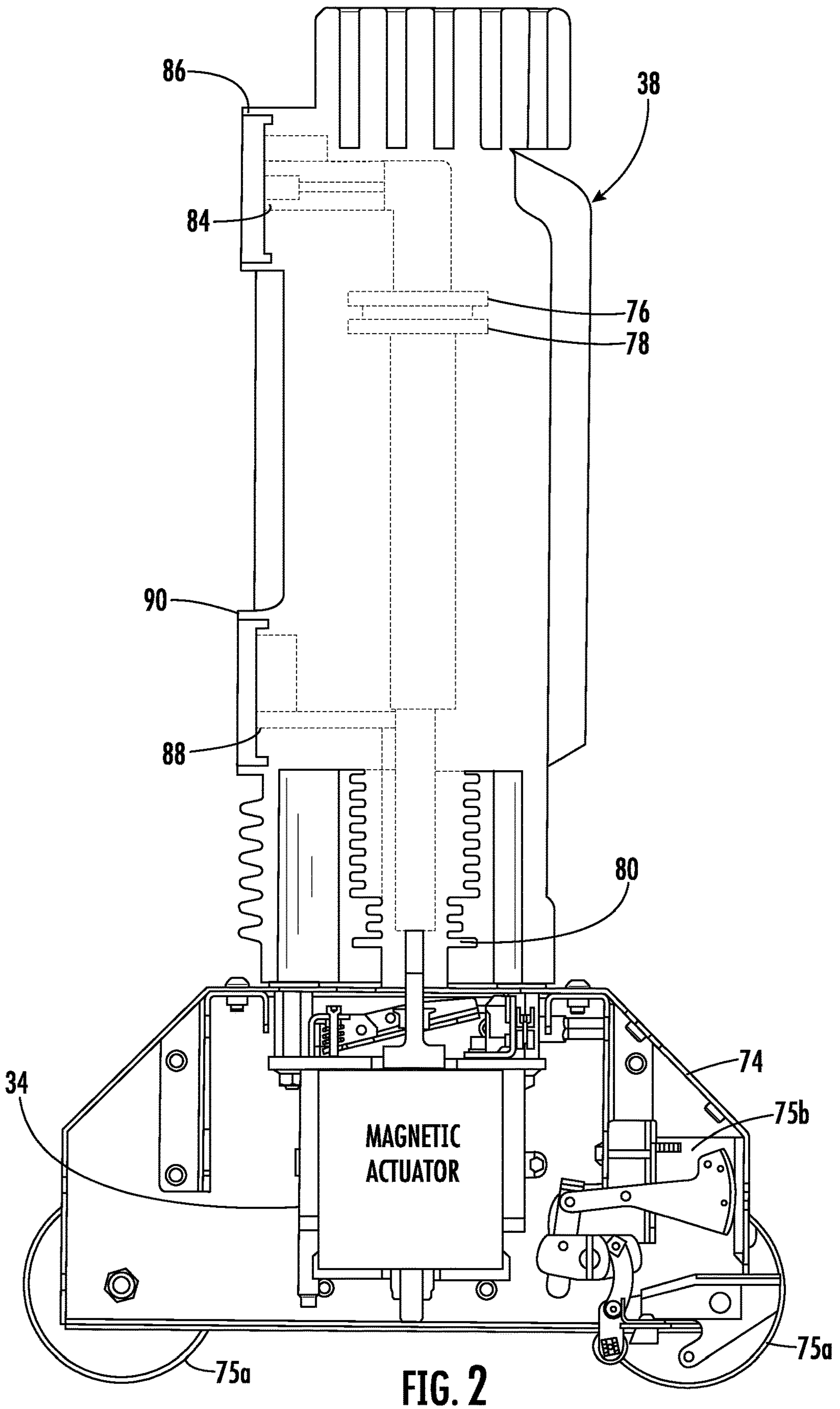
FIG. 2 is a schematic block diagram of the magnetic actuator coupled to a vacuum interrupter in accordance with a non-limiting example.

The three-phase circuit breaker 32 includes the first, second and third single-phase vacuum interrupters 38*a*, 38*b*, 38*c*, and shown generally at 38 in FIG. 2, and configured to be connected between the respective first, second and third single-phase inputs 28*a*, 28*b*, 28*c* and first, second and third single-phase outputs 44*a*, 44*b*, 44*c*. A first magnetic actuator M1 34*a* is connected to the first single-phase vacuum interrupter 38*a*. A second magnetic actuator M2 34*b* is connected to the second single-phase vacuum interrupter 38*b*. A third magnetic actuator M3 34*c* is connected to a third single-phase vacuum interrupter 38*c*. Each magnetic actuator M1 34*a*, M2 34*b*, M3 34*c* may be configured to receive an interrupt signal and in response, actuate the respective vacuum interrupter 38*a*, 38*b*, 38*c* connected thereto into an open circuit condition such that one or more may be activated.

A controller 50 is connected to each of the first, second and third magnetic actuators M1 34*a*, M2 34*b*, M3 34*c*, and configured to generate the interrupt signal to a respective magnetic actuator in response to a detected single-phase overcurrent or fault on a single-phase circuit as part of the load 40 and interrupt that single-phase circuit on which the single-phase overcurrent or fault occurred. One or more vacuum interrupters 38*a*, 38*b*, 38*c* may be interrupted and power maintained on one or more of the remaining single-phase circuits over which a single-phase overcurrent or fault is not detected.

One controller 50 may be used and may be positioned outside of the switchgear 20 or inside. On the other hand, a first controller 50*a* may be connected to the first magnetic actuator M1 34*a*. A second controller 50*b* may be connected to the second magnetic actuator M2 34*b*. A third controller 50*c* may be connected to the third magnetic actuator M3 34*c*, or one controller 50 used as noted before. In another example, the controller 50 may be formed as a single controller module mounted within the interior compartment 43 or mounted outside the compartment and connected to each of the first, second and third magnetic actuators M1 34*a*, M2 34*b*, M3 34*c*.

The loads 40 may include first, second and third single-phase loads and are connected to respective first, second and third single-phase outputs 44*a*, 44*b*, 44*c*, such as the plurality of floors in an apartment building having an electrical demand operating with single-phase, e.g., the upper floors are powered by a single-phase line, the mid-level floors are powered by the second single-phase line, and the lower floors are powered by the third single-phase line. In another example, the first, second and third loads may be a business that uses three-phase power and a group of homes that use a single-phase power.

A sensing circuit as a sensor 60 may be connected to the first, second and third single-phase outputs 44*a*, 44*b*, 44*c* and configured to detect a single-phase overcurrent or fault in one or more of the first, second and third single-phase circuits. The sensing circuit 60 in an example may be formed as three separate sensing circuits connected to respective outputs 44*a*, 44*b*, 44*c*. The sensing circuit 60 is connected to a relay 62, which together with the sensing circuit, senses an overcurrent at the sensing circuit and generates an interrupt signal to the controller 50, which signals a respective magnetic actuator M1 34*a*, M2 34*b*, M3 34*c* to actuate and move the movable contact of the respective vacuum interrupter 38*a*, 38*b*, 38*c* away from its fixed contact and open the circuit in one example. The sensing circuit 60 may be formed as a current or potential transformer or other similar sensing device.

The switchgear 20 may include a switchgear housing and frame 42 as noted before, and include a circuit breaker drive mechanism (not shown) mounted on the switchgear frame 42 and connected to the circuit breaker truck 74 (FIG. 2) for an indoor switchgear, and configured in the indoor switchgear to rack the truck and circuit breaker carried thereon into a first connected position where primary and secondary circuits are electrically connected, rack out the truck into a second test position where a primary circuit is electrically disconnected and a secondary circuit connected, and rack out into a third disconnected position where the primary and secondary circuits are electrically disconnected.

If a truck is used, the truck 74 may include wheels 75*a* and locking mechanism 75*b* connected to the wheels (FIG. 2). The magnetic actuator 34 may be carried in the truck 74. The controller 50 may be formed as a microcontroller or other processor and may be part of the circuit breaker 32 or switchgear 42 or contained in the housing 43 and connected to each of the first, second and third magnetic actuators M1 34*a*, M2 34*b*, M3 34*c*. Further details of the construction of an example of the switchgear 20 may be found in U.S. patent application Ser. No. 17/422,825 filed Jul. 14, 2021, the disclosure which is hereby incorporated by reference in its entirety.

Referring now to FIG. 2, there is illustrated a schematic sectional view of a vacuum interrupter designated generally at 38 for the medium voltage circuit breaker 32 and operated by an example magnetic actuator 34, which may correspond to any one of the three magnetic actuators 34*a*, 34*b*, 34*c* shown in FIG. 1 of the switchgear 20. The medium voltage vacuum interrupter 38 shown schematically in FIG. 2 includes an inner fixed electrical contact 76 and a corresponding movable electrical contact 78 that form the switch for electrical power interruption and are shown in dashed lines. The movable electrical contact 78 is movable between a closed and open position via a connector 80 also in an example termed an insulating contact shaft that connects to an output shaft (FIGS. 3-5 at 114) of the magnetic actuator 34. The vacuum interrupter 38 and magnetic actuator 34 may be carried by the truck 74 for an indoor breaker as noted before or be positioned within one outdoor breaker. The vacuum interrupter's fixed contact 76 forms a fixed terminal 84 at the top that may extend to an upper contact arm 86 as a fixed conductor that connects to the fixed contact 76. The movable contact 78 connects to a flexible terminal or a sliding contact terminal 88 and lower contact arm 90. Upper and lower flanges may be included to hold the arc shield and part of an insulator (not shown in detail). The vacuum interrupter 38 may include a bellows shield and a bellows as examples of common vacuum interrupters in switchgears.

Figure 3:
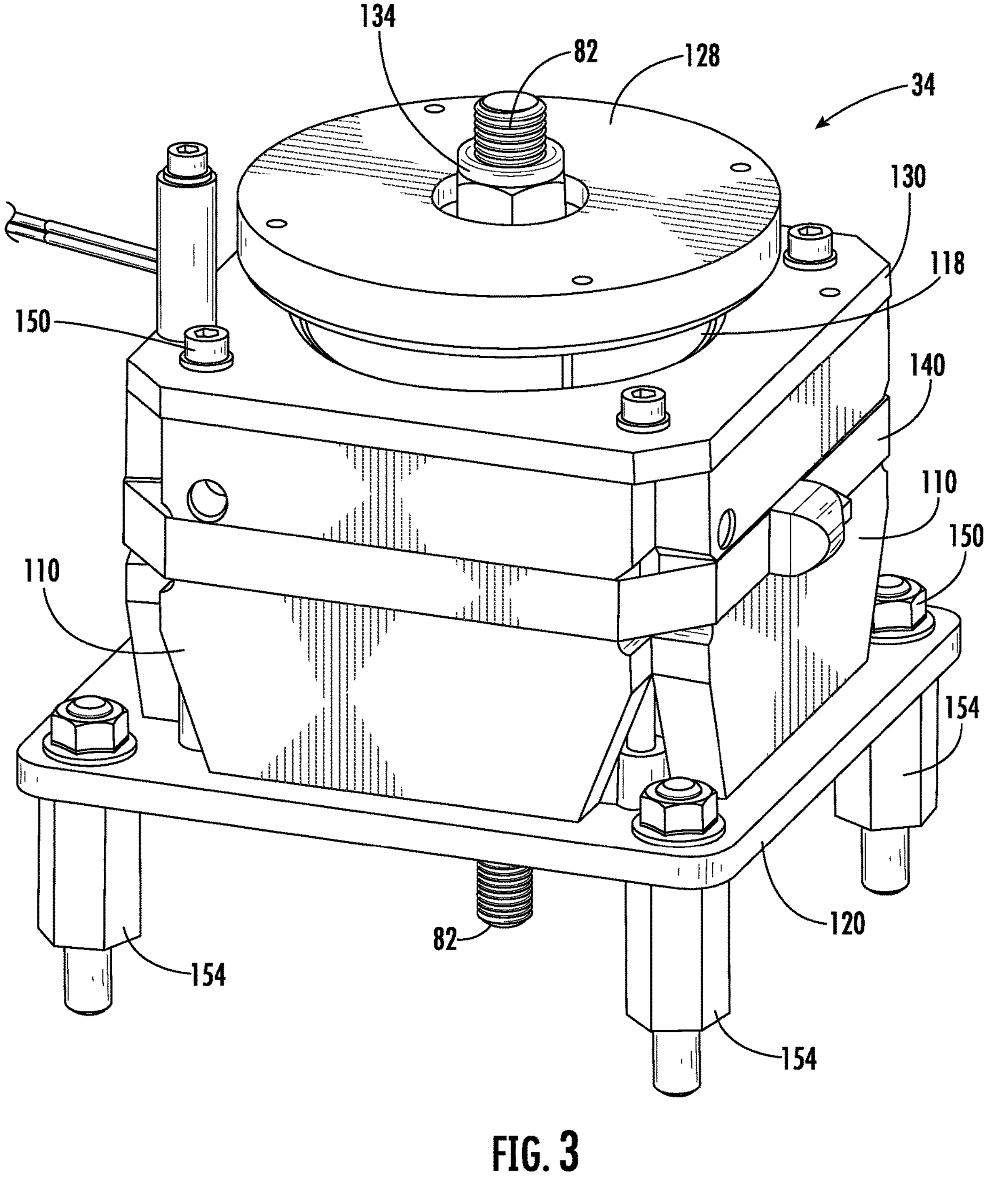
FIG. 3 is an isometric view of an example magnetic actuator that may be used in the circuit breaker shown in FIGS. 1 and 2.
Figure 4:
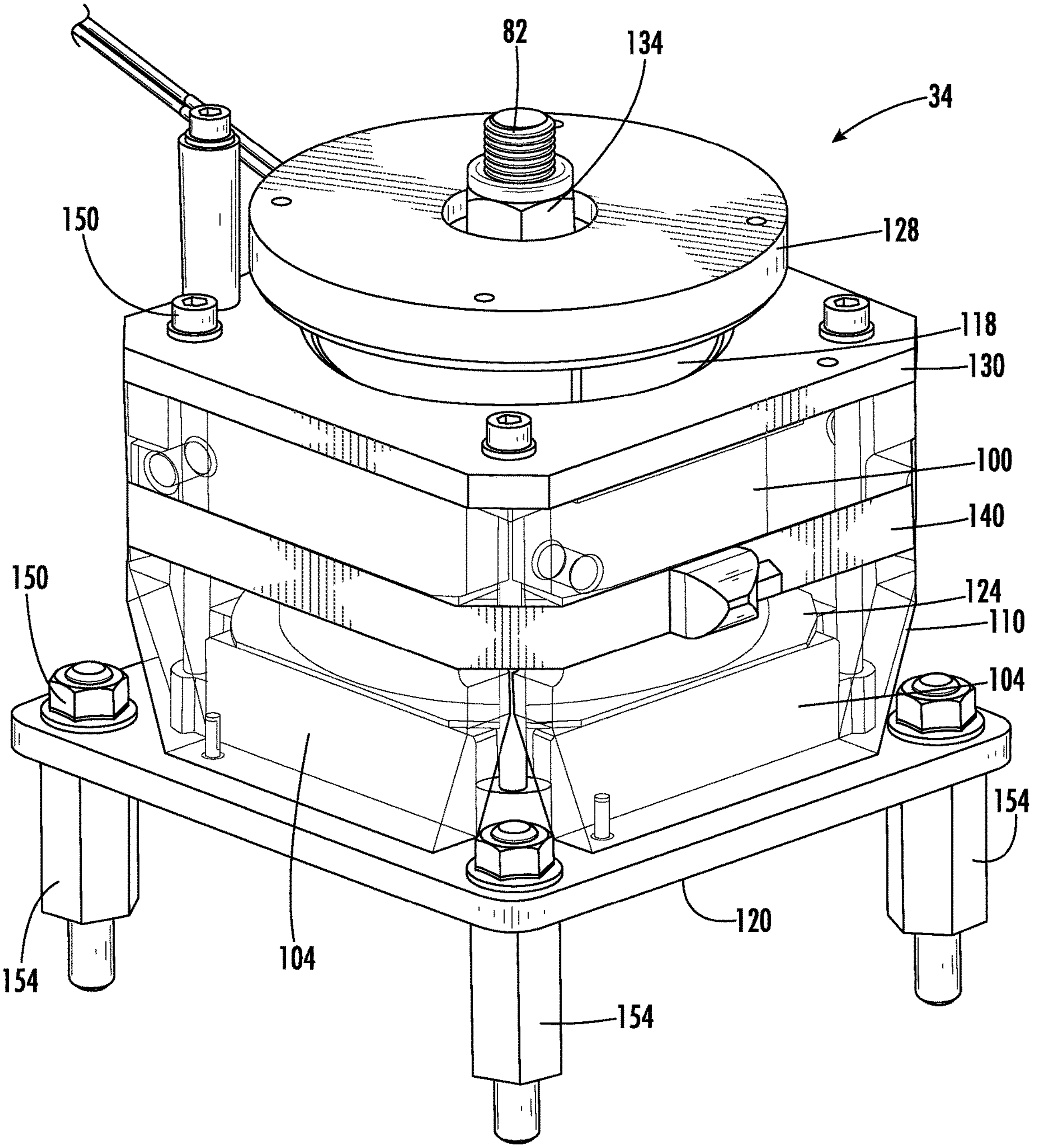
FIG. 4 is another isometric view of the magnetic actuator of FIG. 3, but showing permanent magnets located behind the side plates that are pictured in a transparency view.
Figure 5:
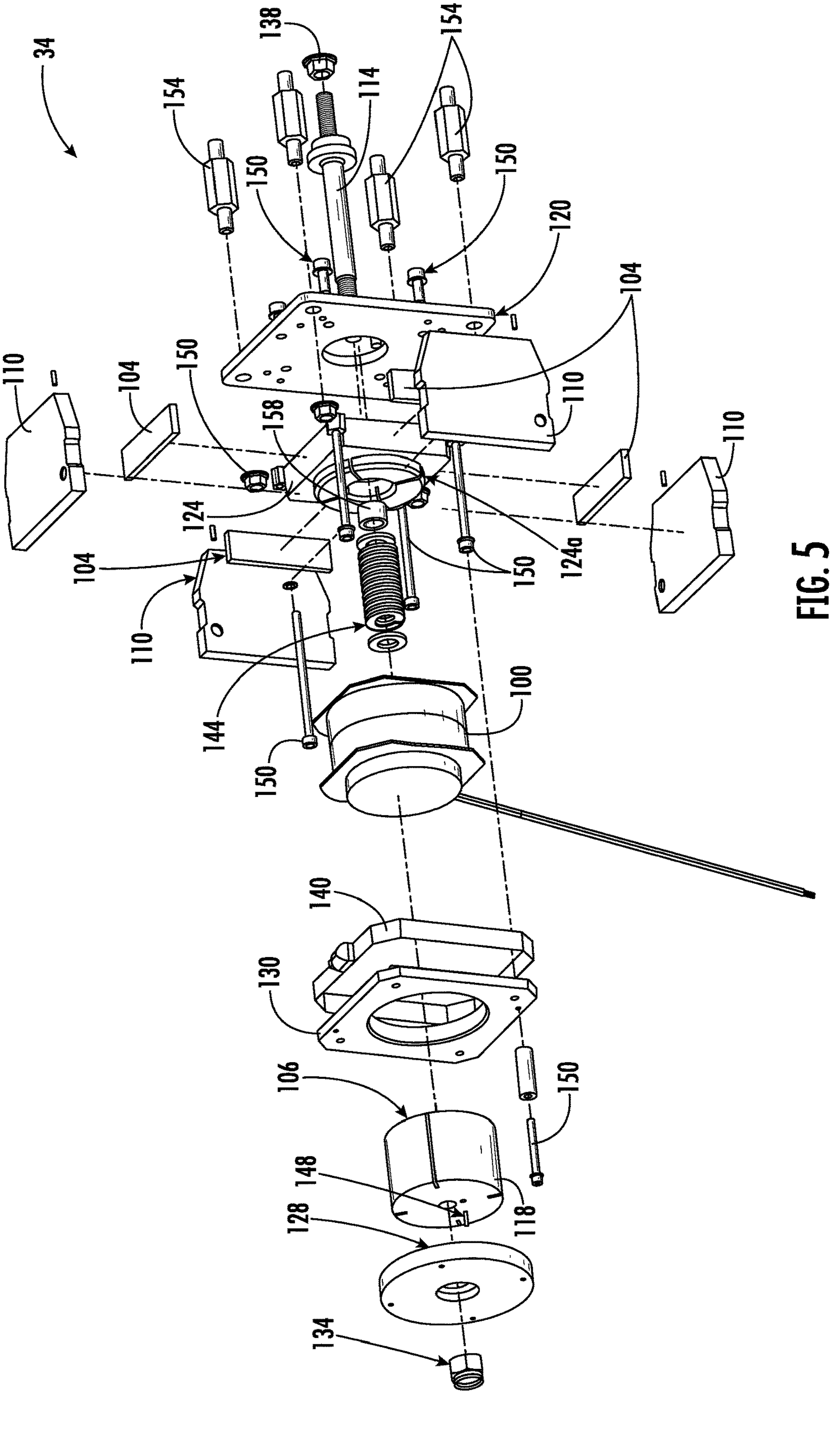
FIG. 5 is an exploded isometric view of the magnetic actuator of FIGS. 3 and 4.

Referring now to FIGS. 3-5, further details of the magnetic actuator 34 are illustrated, which includes a fixed core 124 and a plurality of permanent magnets 104 surrounding the fixed core 124. A movable core 106 (FIG. 5) is received within the fixed core 124 and includes an output shaft 114 coupled to a piston 118 and piston plate 128. In this example, the plurality of permanent magnets 104 are arranged in a square configuration around the fixed core 124 and each permanent magnet may be formed as a bar magnet that extends the length of a side forming the square configuration (FIG. 4). In a non-limiting example, each bar magnet as a permanent magnet 104 may be rectangular configured. A side plate 110 covers each permanent magnet 104 forming a box configuration. The movable core 106 includes its output shaft 114 and a piston 118 and movable within the fixed core 124.

The holding force for the magnetic actuator 34 is developed by the permanent magnets 104 while an electrical coil 100 that may be formed as a single or multiple winding coil provides the closing speed and force that is generated by the coil and amperage flowing in the windings of the coil. The permanent magnets 104 surrounding the fixed core 124 form a toroid of a magnetic field surrounding the fixed core. The output shaft 114 has an end configured to connect to a connector 80, e.g., an insulating contact shaft, as part of the vacuum interrupter 38 connected thereto.

The exploded isometric view of FIG. 5 shows further details where each permanent magnet 104 may be formed as a bar magnet, and in a non-limiting example, may be rectangular configured, and in an example, have dimensions of about 1.0 inch by 4.0 inches and a one-quarter inch thick and formed in this non-limiting example from a machined or cast Neodymium Iron Boron magnet (NdFeB or NIB magnet). One or more magnets 104 may be used per side depending on design. The permanent magnets 104 may be made from this alloy of Neodymium, Iron and Boron in this example and created as a 42H magnet grade as a rare-earth sintered neodymium magnet.

In this example, the magnetic actuator 34 includes an application plate 120 that engages a center block as the fixed core 124. Both the application plate 120 and center block as the fixed core 124 have a central, circular opening into which the output shaft 114 is received. The piston 118 engages the piston plate 128 that engages a bottom plate 130 when the piston plate moves with the piston toward the bottom plate. The movable core 106 as including the output shaft 114 is similar to a push rod and the other components are shown in FIGS. 3-5, the output shaft 114 is secured with a lock nut 134 at the piston plate 128 and with a flange nut 138 at the other end that operates as a connection to the insulating contact shaft 80 also referred to by some as a push rod. The permanent magnets 104 engage against the side of the center block as the fixed core 124, which has a cylindrical fitting 124*a* on which the lower edge of the electrical coil 100 may engage. The side plates 110 help form the square configuration as illustrated and are secured in position at the magnetic actuator 34 and against the application plate 120 and bottom plate 130 via a vibration resistant clamp 140. A die spring 144 is contained within the piston 118 and is secured and aligned to the piston plate 128 via alignment pin 148. Various fasteners 150 are illustrated to hold components together and the stand-offs 154 are illustrated that allow the magnetic actuator 34 to be positioned so that it may be connected to any frame or component inside the truck 74 in this example. The output shaft 114 may be secured to the insulating contact shaft 80.

In an example, the electrical coil 100 resistance may be about 3.8+/−0.2 ohms and the permanent magnets 104 may include a minimum average holding force among five readings that is equal to about 9,000 N (Newtons) with a minimum single hold force reading of a four position rotation of the piston 118 of about 8,900 N. As noted before, holding force is developed by the permanent magnets 104 and closing speed and force is generated by the coil 100 and amperage flowing in the windings. In an example, the magnetic actuator 34 may be formed as an 8.5 kN box actuator having a 14 millimeter travel. The output shaft 114 may pass through a low coefficient of friction, rulon (PTFE) sleeve bearing 158 (FIG. 5) and the die spring 144 has sufficient force for biasing against movement of the applied magnetic force. The die spring 144 biases in the open position.

The controller 50 is connected to the secondary voltage of the switchgear 20 such as 100 volts, 200 volts, or 250 volts, which in one example operates off 250 volts. A charge capacitor (not shown) in an example is always charged to 250 volts and the controller 50 facilitates the connection between the charge capacitor and magnetic actuator 38 to generate the magnetic flux in the coil and move it in the opened and closed condition. The current is short and creates a very strong magnetic field and moves the insulating contact shaft 80 and moves the movable contact 78 relative to the fixed contact 76. The medium voltage switchgear 20 controls the 15 kV power in an example, but operates from the control voltage of 48, 125, 250 volts DC or 120, 220 volts AC.

The magnetic actuator 34 is compact and because of its configuration of the four permanent magnets 104 in a square configuration in this example as illustrated, it is efficient and creates a high permanent magnetic force. The use of flat plates for the permanent magnets 104 generate a more uniform toroid for the magnetic field around the fixed core 124. It is possible that the permanent magnets 104 may be arranged in different configurations besides a square configuration, such as a triangular or a pentagon, i.e., five-sided or other configuration. The side plates 110 may be formed from a ferromagnetic material to carry the magnetic field. The magnetic actuator 34 as described is an improvement over other magnetic actuator designs that may include lower and upper plungers or permanent magnets that may be in a C-shaped armature configuration, or use stacked sheets or energized coils.

Figure 6:
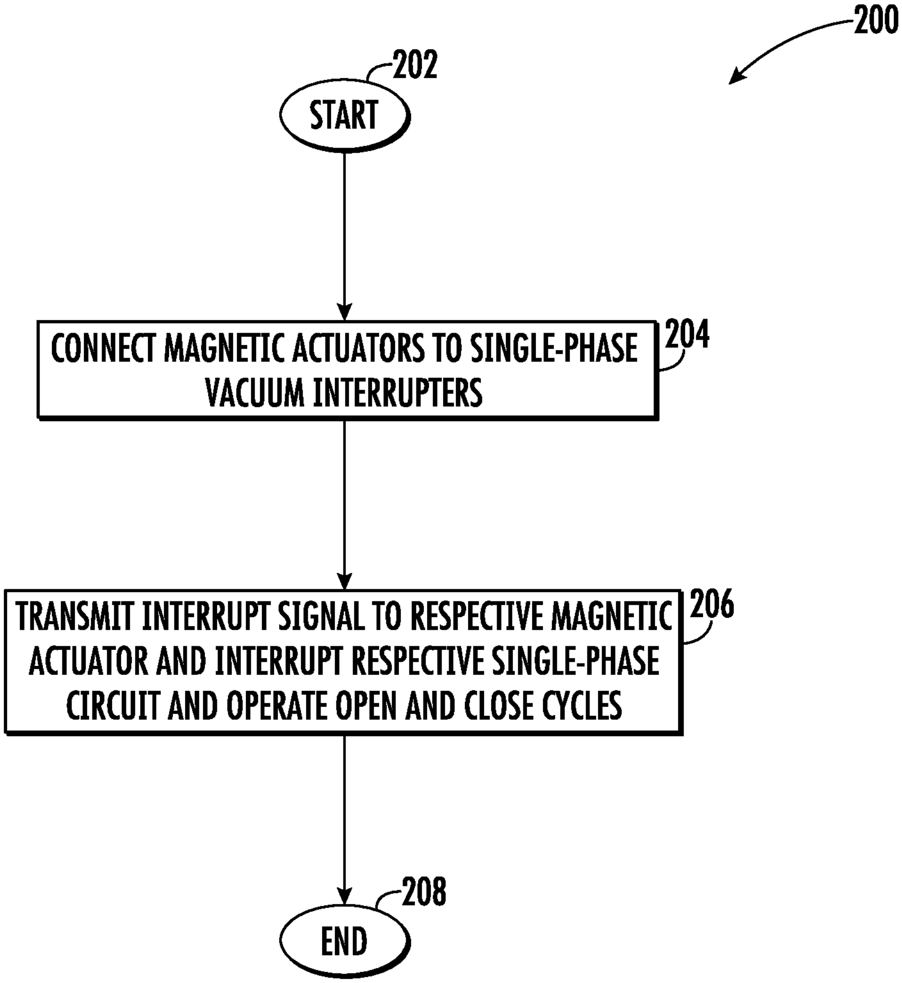
FIG. 6 is a high level flowchart of a method of building the three-phase circuit breaker having single-phase control in accordance with a non-limiting example.

Referring now to FIG. 6, a high-level flowchart of a method of building a three-phase circuit breaker 32 having single-phase control is illustrated at 200. The process starts (Block 202) and the magnetic actuators 34*a*, 34*b*, 34*c* are connected to the single-phase vacuum interrupters 38*a*, 38*b*, 38*c* (Block 204). The interrupt signal is generated through a respective magnetic actuator 34*a*, 34*b*, 34*c* to interrupt a single-phase circuit to which one of the magnet actuators is connected and on which a fault may have occurred while operating opening and closing operations (Block 206). There may be an entire cycle of open and close operations that the circuit breaker 32 goes through before the relay 62 decides it is okay to shut down a vacuum interrupter 38. A fault may be detected and decisions made whether the fault is still there and includes the final decision to stay open. Each single phase may open and close independently of each other, and thus, provide single-phase control. The process ends (Block 208).

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

The invention claimed is:

1. A three-phase, medium voltage switchgear, comprising:
- a switchgear housing having an interior compartment;
- a truck mounted for movement within the interior compartment;
- first, second and third single-phase vacuum interrupters mounted within the interior compartment on the truck and extending upward therefrom, each configured to be connected to respective first, second and third single-phase input circuits from a three-phase power distribution grid and to respective first, second and third single-phase outputs connected to a load;
- first, second and third magnetic actuators mounted within the truck adjacent and connected to the respective first, second and third single-phase vacuum interrupters, each magnetic actuator configured to receive an interrupt signal and in response, actuate the respective single-phase vacuum interrupter connected thereto into an open circuit condition, wherein each magnetic actuator comprises,
  - a fixed core,
  - a plurality of permanent magnets surrounding the fixed core,
  - a movable core received within the fixed core;
- a sensing circuit operatively connected between first, second and third single-phase outputs and the load, said sensing circuit configured to detect one or more single-phase overcurrents or faults on one or more single-phase circuits of the load; and
- a controller connected to each of said first, second and third magnetic actuators and sensing circuit, and configured to generate the interrupt signal to a respective magnetic actuator connected to the single-phase vacuum interrupter over which a single-phase overcurrent or fault had been detected and actuate the respective single-phase vacuum interrupter into an open circuit condition.

2. The circuit breaker of claim 1 wherein said plurality of permanent magnets are arranged in a square configuration around the fixed core.

3. The circuit breaker of claim 2 wherein each permanent magnet comprises a bar magnet extending the length of a side forming the square configuration.

4. The circuit breaker of claim 3 comprising a side plate covering each permanent magnet forming a box configuration.

5. The circuit breaker of claim 1 wherein each movable core comprises an output shaft and a piston carried by the output shaft and movable within the fixed core.

6. The circuit breaker of claim 5 comprising first, second and third connectors interconnecting the output shafts of respective first, second and third magnetic actuators to respective first, second and third single-phase vacuum interrupters.

7. The circuit breaker of claim 1 further comprising a relay connected between said first, second and third single-phase vacuum interrupters and first, second and third single-phase outputs.

8. The circuit breaker of claim 1 wherein said sensing circuit comprises at least one current or potential transformer.

9. A magnetic actuator for a single-phase vacuum interrupter, comprising:
- a fixed core;
- a movable core received within the fixed core and comprising an output shaft and piston carried by the output shaft and movable within the fixed core; and
- a plurality of permanent magnets arranged in a square configuration around the fixed core and forming a toroid of magnetic field surrounding the fixed core, wherein said output shaft has an end configured to connect to a vacuum interrupter.

10. The magnetic actuator of claim 9 wherein each permanent magnet comprises a bar magnet extending the length of a side forming the square configuration.

11. The magnetic actuator of claim 10 comprising a side plate covering each permanent magnet forming a box configuration.

12. The magnetic actuator of claim 11 comprising a clamp member surrounding said side plates and holding the side plates together in the box configuration.

13. A method of operating a three-phase, medium voltage switchgear, the switchgear comprising:

a switchgear housing having an interior compartment;

a truck mounted for movement within the interior compartment;

first, second and third single-phase vacuum interrupters mounted within the interior compartment on the truck and extending upward therefrom, each configured to be connected to respective first, second and third single-phase input circuits from a three-phase power distribution grid and to respective first, second and third single-phase outputs connected to a load;

first, second and third magnetic actuators mounted within the truck adjacent and connected to the respective first, second and third single-phase vacuum interrupters, each magnetic actuator configured to receive an interrupt signal and in response, actuate the respective single-phase vacuum interrupter connected thereto into an open circuit condition, wherein each magnetic actuator comprises, a fixed core, a plurality of permanent magnets surrounding the fixed core, a movable core received within the fixed core;

a sensing circuit operatively connected between first, second and third single-phase outputs and the load, said sensing circuit configured to detect one or more single-phase overcurrents or faults on one or more single-phase circuits of the load; and a controller connected to each of said first, second and third magnetic actuators and sensing circuit, the method comprising generating the interrupt signal to a respective magnetic actuator connected to the single-phase vacuum interrupter over which a single-phase overcurrent or fault had been detected and actuating the respective single-phase vacuum interrupter into an open circuit condition.

14. The method of claim 13 wherein said plurality of permanent magnets are arranged in a square configuration around the fixed core.

15. The method of claim 14 wherein each permanent magnet comprises a bar magnet extending the length of a side forming the square configuration.

16. The method of claim 15 comprising a side plate covering each permanent magnet forming a box configuration.

17. The method of claim 13 wherein each fixed core comprises an output shaft and a piston carried by the output shaft and movable within the fixed core.

18. The method of claim 17 comprising interconnecting output shafts of respective first, second and third magnetic actuators to respective first, second and third single-phase vacuum interrupters.

19. The method of claim 13 comprising a relay between said first, second and third single-phase vacuum interrupters and first, second and third single-phase outputs.

* * * * *